Sept. 1, 1959  F. L. DAVIS  2,902,303
DETACHABLE SHAFT COLLARS
Filed Nov. 9, 1955
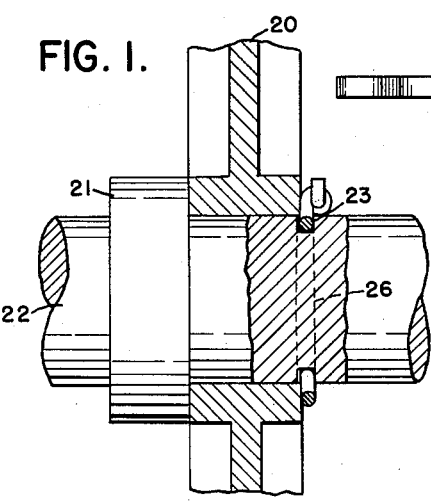
FIG. 1.
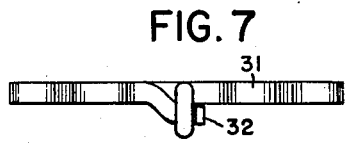
FIG. 7
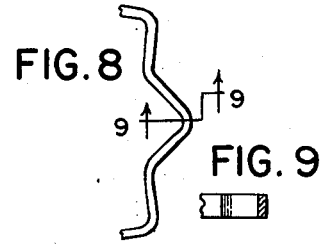
FIG. 8  FIG. 9
FIG. 12.
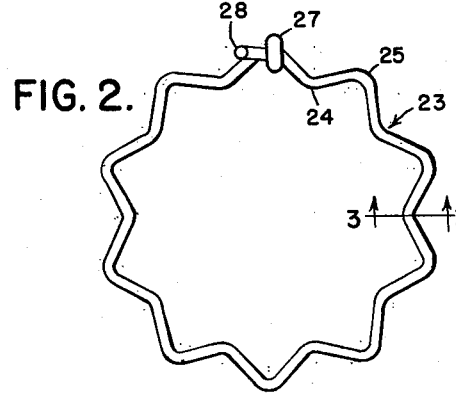
FIG. 2.  FIG. 3.
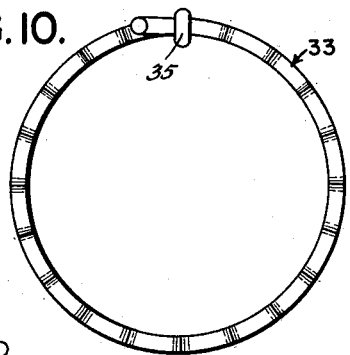
FIG. 10.
FIG. 11.
FIG. 4
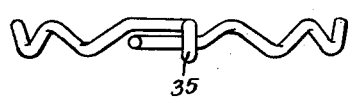
FIG. 13.  FIG. 14.
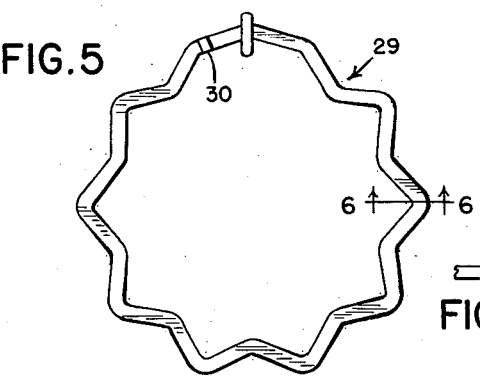
FIG. 5  FIG. 6.
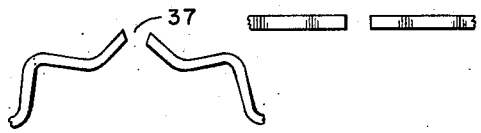
FIG. 15.
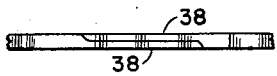
INVENTOR.
Frederick L. Davis
BY
Francis G. Boswell
ATTORNEY

2,902,303
DETACHABLE SHAFT COLLARS

Frederick L. Davis, Hope Mills, N.C., assignor, by mesne assignments, to Welex, Inc., Fort Worth, Tex., a corporation of Texas Application November 9, 1955, Serial No. 545,909

1 Claim. (Cl. 287—52)

The object of the invention is to provide a collar susceptible of application to a shaft, or interiorly to a sleeve, to provide an abutment to preclude laterally movement of a free rolling wheel or pulley on a shaft, or to act as an abutment to limit axial movement of a shaft or rod in a sleeve; to provide a collar of the kind indicated which needs no set screw to retain it in place; to provide a device of the kind indicated which acts as a lateral spring abutment for the part whose position is designed to attain; and finally to provide a detachable collar which is of simple form and therefore susceptible of cheaper manufacture and sale.

With this object in view, the invention consists in a construction and combination of parts of which preferred embodiments are illustrated in the accompanying drawings, wherein:

Figure 1 is a view partly in section and partly in elevation showing the practical application of the invention as a means for attaining a freely moving pulley in position;

Figure 2 is an elevational view of one form of the invention;

Figure 3 is a sectional view on the plane indicated by the line 3—3 of Figure 2;

Figure 4 is an edge or plane view of the structure of Figure 2;

Figure 5 is an elevational view similar to Figure 2 but where the ring is cross-sectionally square;

Figure 6 is a sectional view on the plane indicated by the line 6—6 of Figure 5;

Figure 7 is an edge or plan view of that form of the invention in which the material of the ring is cross sectionally rectangular;

Figure 8 is a detail elevational view of a section of the ring of Figure 7;

Figure 9 is a sectional view on the plane indicated on the line 9—9 of Figure 8;

Figure 10 is an elevational view of another modified form of the invention;

Figure 11 is an edge elevational view of the structure of Figure 10;

Figure 12 is a sectional view illustrating the use of the internal ring;

Figure 13 is an elevational detail view of a portion of the ring illustrated in Figure 12;

Figure 14 is an edge view of the structure of Figure 13; and

Figure 15 is an edge elevational view of a modified form of the structure of Figure 13.

As illustrated in Figure 1, the ring is employed to prevent lateral movement of the pulley 20 the hub of which abuts the fixed collar 21 on one side; the collar being a fixed part of the shaft 22 on which the pulley is designed to freely rotate. The ring 23 laterally abuts the pulley on the opposite side so as to preclude any lateral movement of the pulley. In this form of the invention, the ring 23 is formed of a cross sectionally round stock which before bending into circular form, as shown in Figure 2, is bent back and forth to provide the dips and rises 24 and 25. In other words, the ring before bending into circular form is given a sinuous shape, so that when given an over-all ring shape, the dips enter a slot 26 in the shaft 22 while the peaks or rises 25 project beyond the periphery of the shaft and these are what act as lateral abutments for the pulley or other wheel or other device which it is designed to retain on the shaft. While, in Figure 1, a fixed shoulder is shown, it is obvious that two rings 23 may be employed on opposite sides of the pulley, the shaft being slotted at appropriate points to receive the ring.

In order that the ring may be prevented from spreading and thus from being cast off the shaft, one end of the stock is formed with an eye 27 on one extremity and a terminal hook 28 at the other. In that form of the invention illustrated in Figure 2 the terminal of the hook 28 is turned laterally and while the adjacent stem portion passes through the eye 27, the terminal is spaced from the latter when the ring is situated in the slot on the shaft. But the ring may be diametrically spread until the terminal 28 abuts the eye 27 which will permit the ring being slid over the shaft until it finds the slot 26 and, being of spring material, will contract into the slot.

Instead of being turned laterally as illustrated in Figure 2, the terminal of the hook may be turned upwardly or in a radial direction as indicated at 28a in Figure 4, but it functions precisely as when positioned as shown in Figure 2.

In the modification illustrated in Figure 5, the stock of which the ring is formed, instead of being cross sectionally round, is cross sectionally square, but otherwise the ring 29, illustrated in Figure 2, is identical in shape and function to ring 23, having its hook terminal 30 bend laterally, as is the case with the structure Figure 2.

In that form of the invention illustrated in Figure 7, the stock of which the ring 31 is formed, is cross sectionally rectangular, as illustrated in Figure 9 and its hook terminal 32 is bent up radially, a condition which results from bending a terminal after the placement of the ring on the shaft. In this form of the invention no provision for play between the ring and the hook terminal is provided and the ring is locked in position on the shaft by bending up the hook terminal after attachment to the shaft.

In that form of the invention illustrated in Figure 10, in which the stock is cross sectionally round, the ring 33 is formed so that the sinuous shape is lateral of the ring, rather than radial as in the previously described forms. Otherwise, this form is like the other forms except that the laterally sinuous shape tends to bind the ring frictionally in the slot in which it is received and the ring perforce must be of a sufficient diameter cross sectionally to project far enough out of the slot to form a shoulder. While the ring 33 is cross sectionally circular, a similar ring may be formed of cross sectionally square or cross sectionally rectangular stock. In this form of the invention, by reason of the sinuosities being laterally of the ring, the latter is laterally but resiliently compressible, so that any element carried on the slotted member and movable with respect thereto is cushioned against a resilient shoulder, that is, the slotted member is saved from sudden shock by any lateral movement of the carried element. Also, if the element carried on the slotted member be a gear or wheel, the peaks of the sinuosities provide spaced contacting shoulders for the gear or wheel, thus reducing to a minimum, lateral friction against the shoulder as a whole. When the ring is fabricated for exterior application, the terminals have a running engagement one with the other through the employment of an eye 35 as one terminal in which the straightened portion of the other terminal slides, the exterior diameter of the eye being not in excess of the over-all lateral thickness of the ring. Where the ring is used internally the sleeve 34 is provided with a slot in which it is received and the ring 36 omits the eye and hook terminals, the extremities being separated as indicated at 37 in Figure 13. This ring is inserted by compressing it circumferentially so it may enter the bore of the sleeve and find its way to the slot into which it will spring and thereafter function as an abutment for limited movement of any devices entering the sleeve.

Instead of being made terminally as indicated in Figure 13, the ring may be formed with overlapping terminals 38 as indicated in Figure 15, otherwise it will function both in placement in the slot and in function thereafter, as does the ring 36.

The invention having been described, what is claimed as new and useful is:

An abutment ring for application to a circumferentially slotted member to provide a lateral abutment thereon, the same comprising a sinuous strip bent into ring form with the sinuosity laterally of the ring, the ring being of spring metal for contraction into the slot and being of a sufficient diameter cross sectionally to project out of the slot to form a shoulder, one terminal of the strip having an eye and the other terminal having a hook of which the shank has a running engagement with the eye, the outside diameter of the eye being not in excess of the over-all lateral thickness of the ring.

References Cited in the file of this patent

UNITED STATES PATENTS

| | | |
|---|---|---|
| Re. 18,144 | Heiermann | Aug. 4, 1931 |
| 1,161,078 | Slade | Nov. 23, 1915 |
| 1,409,320 | Voss | Mar. 14, 1922 |
| 1,994,617 | Meehan | Mar. 19, 1935 |
| 2,567,543 | Brell | Sept. 11, 1951 |
| 2,577,009 | Frantz | Dec. 4, 1951 |

FOREIGN PATENTS

| | | |
|---|---|---|
| 417 | Great Britain | Jan. 7, 1908 |
| 801,353 | Germany | Jan. 4, 1951 |
| 980,814 | France | May 18, 1951 |